United States Patent [19]

Halls

[11] 4,414,793
[45] Nov. 15, 1983

[54] FLEXIBLE CROP HARVESTING HEADER

[75] Inventor: Lawrence M. Halls, New Holland, Pa.

[73] Assignee: Sperry Corporation, New Holland, Pa.

[21] Appl. No.: 306,635

[22] Filed: Sep. 28, 1981

[51] Int. Cl.³ ............................................. A01D 55/32
[52] U.S. Cl. ..................................... 56/14.4; 56/15.3; 56/15.8
[58] Field of Search .................. 56/14.3, 14.4, 14.5, 56/15.3, 15.8, 12.7, 208, 210, 320.1, 10.2, 10.4

[56] References Cited

U.S. PATENT DOCUMENTS

| | | | |
|---|---|---|---|
| 2,599,438 | 6/1952 | Downing et al. | 56/158 |
| 2,795,922 | 6/1957 | Hume | 56/257 |
| 3,388,539 | 6/1968 | Novak | 56/257 |
| 3,886,718 | 6/1975 | Talbot | 56/208 |
| 3,975,005 | 8/1976 | Duchemin | 267/47 |
| 3,982,283 | 8/1970 | Mott | 56/11.6 |
| 3,989,425 | 11/1976 | Walker et al. | 267/47 |
| 4,011,709 | 3/1977 | Mott et al. | 56/10.4 |
| 4,091,602 | 5/1978 | Williams et al. | 56/14.4 |
| 4,199,925 | 4/1980 | Quick et al. | 56/208 |
| 4,206,583 | 6/1980 | Johnson et al. | 56/15.8 |
| 4,206,584 | 6/1980 | Johnson et al. | 56/15.8 |
| 4,324,092 | 4/1982 | Halls et al. | 56/298 |

Primary Examiner—Gene Mancene
Assistant Examiner—David I. Tarnoff
Attorney, Agent, or Firm—Larry W. Miller; Darrell F. Marquette; Frank A. Seemar

[57] ABSTRACT

A crop harvesting header, attachable to a combine to sever standing crop and intiate the crop harvesting process, is disclosed wherein both the cutterbar and the floor of the header are somewhat flexibly constructed to follow the contour of the ground and harvest low growing crops. A counterbalancing force for the cutterbar is provided by leaf spring members spaced along the width of the header. These leaf spring members are connected to a lower portion of the header in such a manner as to enable the amount of countebalancing force supplied to the cutterbar to be variable by changing the number of leaf spring members exerting a counterbalancing force, either by increasing the number of locations that the leaf spring members are connected to the header frame or by increasing the number of leaf spring members at each location. Attachment ribs pivotally interconnecting the cutterbar and the header frame provide stability against side-to-side movements by the cutterbar relative to the header frame without subjecting the leaf spring members to such forces and without requiring extra frame members to prevent the side-to-side movements of the cutterbar.

11 Claims, 7 Drawing Figures

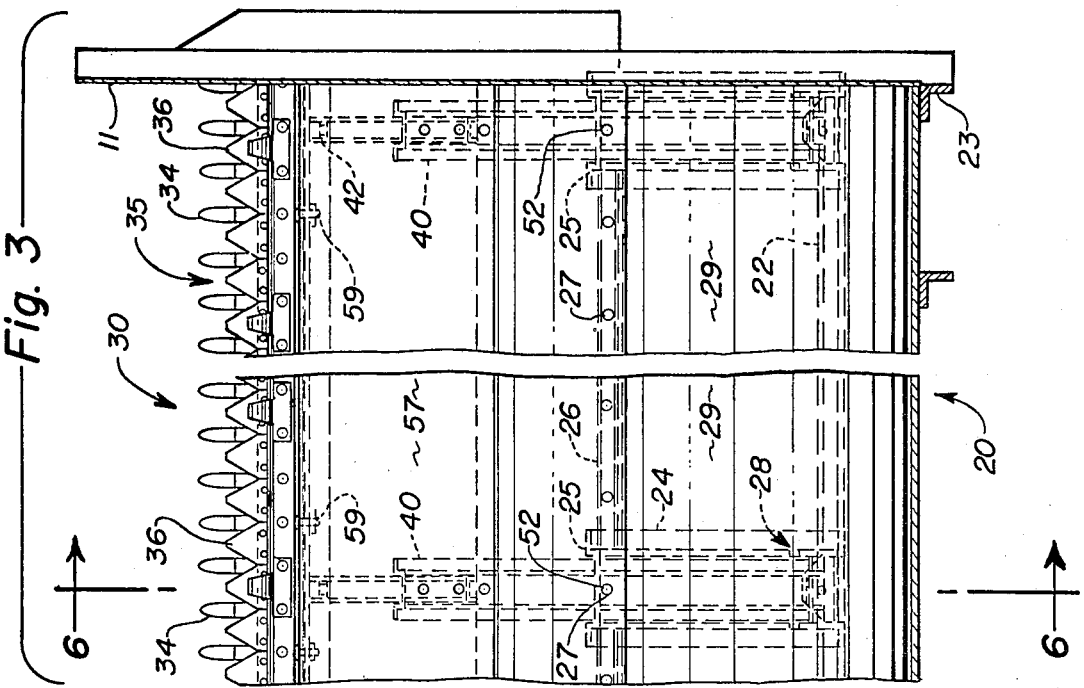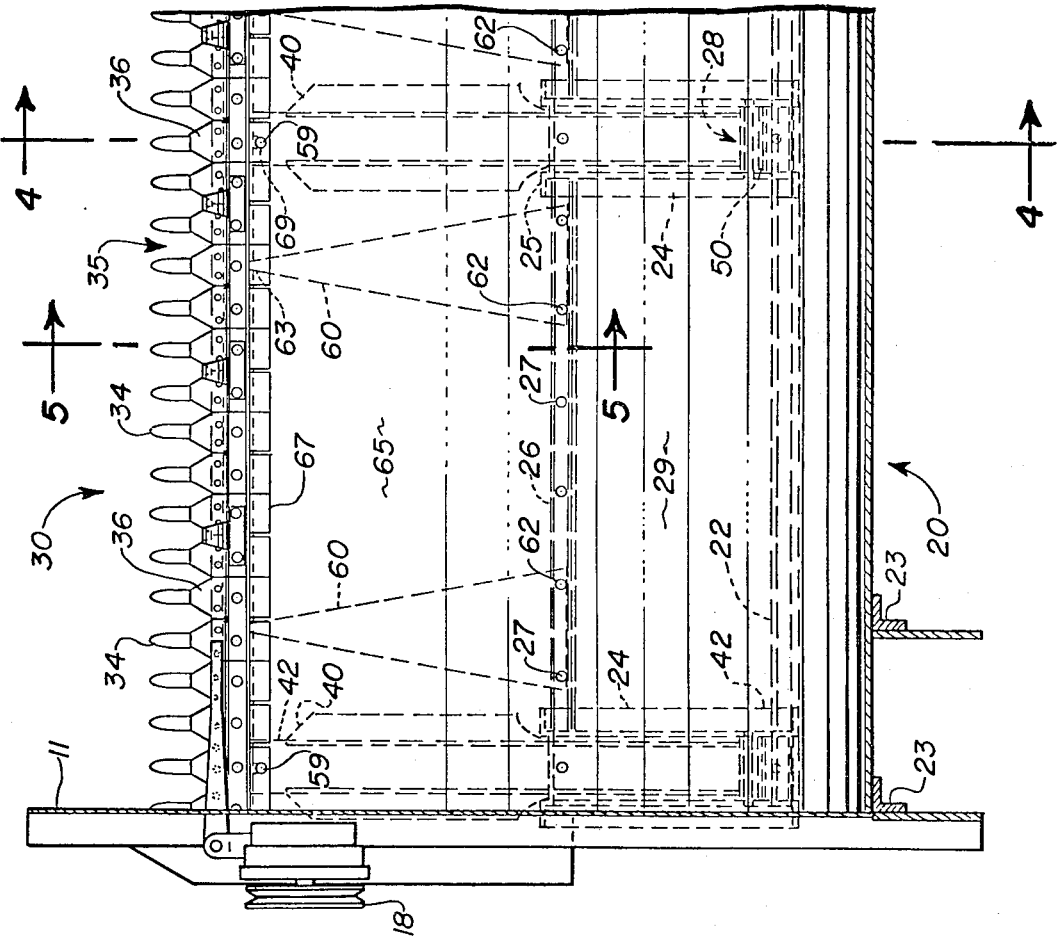

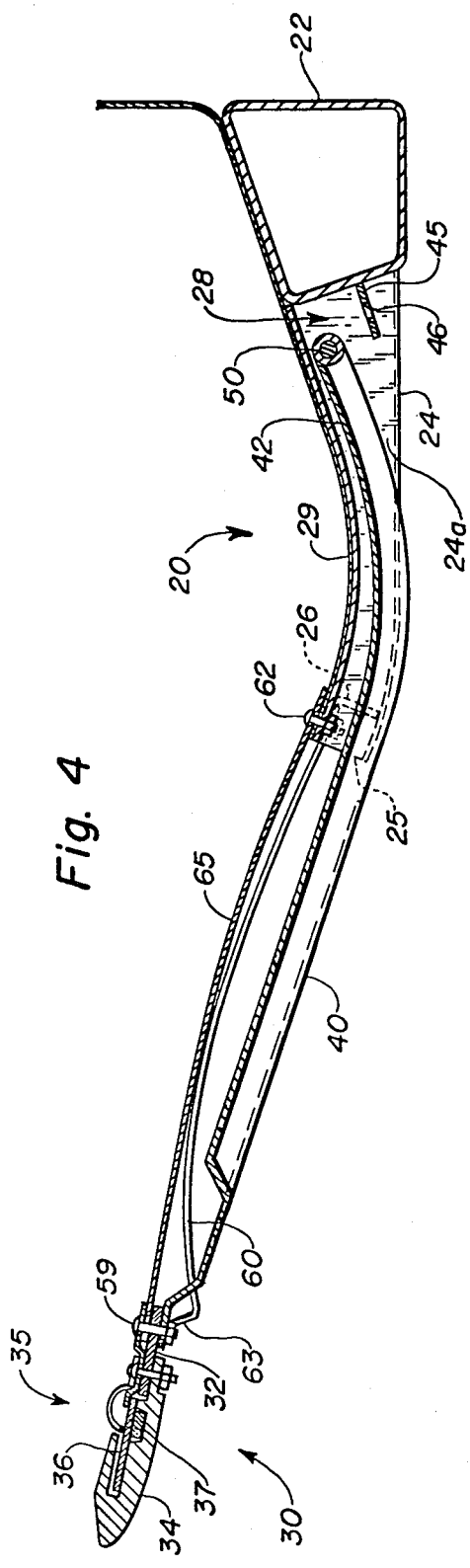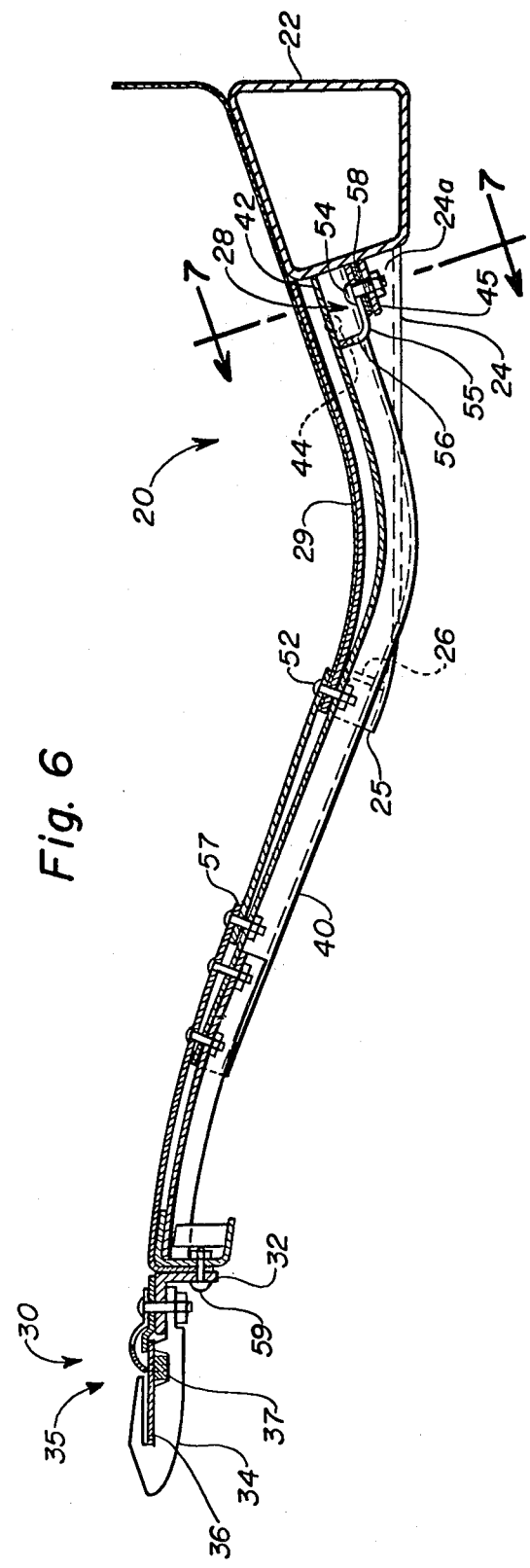

4,414,793

FLEXIBLE CROP HARVESTING HEADER

BACKGROUND OF THE INVENTION

The present invention relates generally to crop harvesting process and, more particularly, to improvements in flexible headers having a cutterbar that is vertically movable relative to the frame of the header.

To harvest crops growing close to the ground, such as soybeans, it is necessary to get the cutterbar of the crop harvesting header as close to the ground as possible without permitting the cutterbar to impact into the ground. Floating cutterbars, such as depicted in U.S. Pat. No. 3,388,539 and U.S. Pat. No. 3,886,718, could be attached to a header to harvest crop close to the ground. Such add on cutterbars were able to flex vertically to follow minor irregularities in the shape of the ground surface, even though the header itself remained relative rigid and, thereby, cut crop material close to the ground along substantially the entire width of the header without great danger of damage due to impact with the ground.

To overcome disadvantages inherent in the floating cutterbars, such as properly feeding severed crop rearwardly toward the combine, the header itself has been designed to flex with the cutterbar along undulations in the ground surface, such as is seen in U.S. Pat. No. 3,982,383 and U.S. Pat. No. 4,091,602. Such prior art structures suffer from the disadvantage of not being able to vary the amount of counterbalancing force supplied to the cutterbar by the upwardly lifting spring members. Some prior art structures also have a problem of stabilizing the cutterbar from side-to-side movements due to momentum imparted to the cutterbar by the reciprocatory action of the cutterbar drive and to forces imposed by contact with the ground surface.

SUMMARY OF THE INVENTION

It is an object of this invention to overcome the aforementioned disadvantages of the prior art by providing a flexible header utilizing attachment ribs fixedly attached to the cutterbar and pivotally connected to the header frame to stabilize the header and a plurality of leaf spring members to counterbalance the weight of the cutterbar.

It is another object of this invention to provide a crop harvesting header that will generally flex with the cutterbar to follow the contour of the earth's surface and eliminate feeding problems associated with prior art floating cutterbars suspended from a non-flexing header.

It is still another object of this invention to support the cutterbar upon the leaf spring members without direct connection therebetween so that the leaf spring members only provide an uplifting force to the cutterbar and are not subjected to side-to-side forces.

It is an advantage of this invention that the leaf spring members are not utilized to absorb any of the side forces imposed on the cutterbar.

It is a feature of this invention that the attachment ribs pivotally interconnecting the header frame and the cutterbar, absorb a substantial amount of the forces tending to move the cutterbar from side-to-side and thereby stabilize the header.

It is yet another object of this invention to attach the leaf spring members to a portion of the header frame in such a manner as to permit the addition of other leaf spring members to increase the amount of counterbalancing force applied to the cutterbar.

It is a further object of this invention to provide a curved shape to the leaf spring members so that the header floor can be supported thereon between the cutterbar and the header frame.

It is another advantage of this invention that the header floor can be constructed of relatively thin sheet metal, since it receives support from the leaf spring members intermediate of the cutterbar and the header frame.

It is a still further object of this invention to provide a flexible header having the capability of varying the amount of counterbalancing force to the cutterbar by varying the number of leaf spring members exerting a counterbalancing force.

It is another feature of this invention that the number of leaf spring members can be varied by either stacking a number of leaf spring members at one location or by increasing the number of leaf spring member locations along the width of the header.

It is yet a further object of this invention to provide a flexible crop harvesting header which is durable in construction, inexpensive of manufacture, carefree of maintenance, facile in assemblage, and simple and effective in use.

These and other objects, features and advantages are accomplished according to the instant invention by providing a crop harvesting header, attachable to a combine to sever standing crop and initiate the crop harvesting process, wherein both the cutterbar and the floor of the header are somewhat flexibly constructed to follow the contour of the ground and harvest low growing crops. A counterbalancing force for the cutterbar is provided by leaf spring members spaced along the width of the header. These leaf spring members are connected to a lower portion of the header in such a manner as to enable the amount of counterbalancing force supplied to the cutterbar to be variable by changing the number of leaf spring members exerting a counterbalancing force, either by increasing the number of locations that the leaf spring members are connected to the header frame or by increasing the number of leaf spring members at each location. Attachment ribs pivotally interconnecting the cutterbar and the header frame provide stability against side-to-side movements by the cutterbar relative to the header frame without subjecting the leaf spring members to such forces and without requiring extra frame members to prevent the side-to-side movements of the cutterbar.

BRIEF DESCRIPTION OF THE DRAWINGS

The advantages of this invention will become apparent upon consideration of the following detailed disclosure of the invention, especially when taken in conjunction with the accompanying drawings wherein:

FIG. 2 is a partial cross sectional view of the flexible header seen in FIG. 1 taken along lines 2—2, showing the left side of the header;

FIG. 3 is a partial cross sectional view of a crop harvesting header constructed so that the cutterbar is rigidly connected to the header frame, FIG. 3 corresponding to the view seen in FIG. 2, but showing the right side of a rigid header;

FIG. 4 is a cross sectional view through the attachment rib of the flexible header seen in FIG. 2, taken along lines 4—4;

FIG. 6 is a cross sectional view through the attachment rib of the rigid header seen in FIG. 3 and taken along lines 6—6.

DETAILED DESCRIPTION OF THE PREFERRED EMBODIMENT

Figure 1:
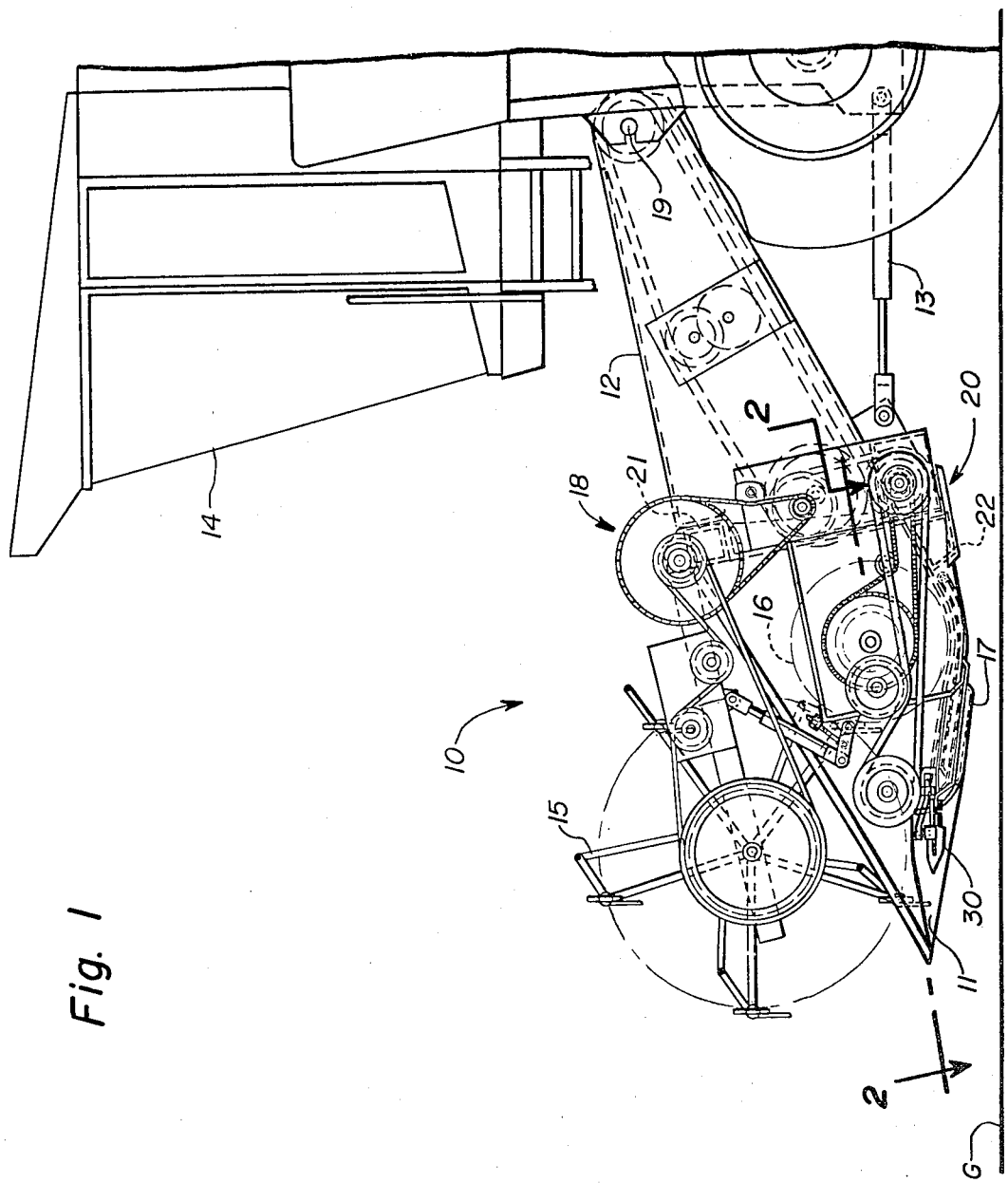
FIG. 1 is a side elevational view of a flexible crop harvesting header, wherein the cutterbar is free to move a limited amount relative to the header frame, incorporating the principles of the instant invention.

Referring now to the drawings and, particularly, to FIG. 1, a side elevational view of a flexible crop harvesting header, attached to a crop harvesting machine, commonly referred to as a combine, can be seen. Any left and right references are used as a matter of convenience and are determined by standing at the rear of the machine, facing the forward end, the direction of travel. The crop harvesting header 10 is shown attached to the feeder house structure 12 through which crop material is conveyed to the combine 14 for harvesting treatment. The header 10 includes spaced apart sidewalls 11 defining the width of the header, a reel 15 for conveying severed crop rearwardly, a transverse consolidating auger 16, which feeds the severed crop to the feeder house 12, and drive mechanism 18 for powering the reel 15, the auger 16 and a reciprocating cutterbar 30. The operation and purpose of these components is well known in the art and need not be further discussed. By manipulation of the hydraulic cylinders 13, the header 10 and attached feeder house 12 can pivot about the connection point 19 to raise or lower the header 10 relative to the ground G. The normal operation of a flexible header 10, as seen in FIG. 1, is generally with the skid plate 17 contacting the ground G to keep the cutterbar 30 as close to the ground as possible.

BASIC HEADER FRAME

Referring now to FIGS. 1, 2, 3, 4 and 6, the basic header frame 20 for use in constructing both a flexible and a rigid header can be seen. The frame 20 includes an upper transverse main beam 21, which is used to support the header 10 on the feeder house 12, and a lower transverse beam 22, which is connected to the upper beam 21 by a series of vertical members 23, such as seen in FIG. 2 as right angles. A plurality of hat-shaped channel members 24 are fixed to the lower transverse beam 22 and extend forwardly therefrom. These spaced apart channel members 24 are interconnected at their forwardmost end 25 by a transversely disposed front connection member 26, shown in the drawings in the form of a right angle member, which has a plurality of holes 27 spaced along the length thereof. Each hat-shaped channel member 24 includes a pair of spaced apart, generally vertical flange portions 24a and houses a rearward connection area 28 therebetween and adjacent the lower transverse beam 22. The hat-shaped channel members 24 and the lower transverse beam 22 support a rearward curved floor member 29, forming a trough in which the auger 16 operates.

A cutterbar 30 is mounted at the forward end of the header 10 to sever standing crop material and, thereby, initiate the crop harvesting process. The cutterbar 30 includes a primary support bar 32 positioned transverse to the direction of travel. A plurality of knife guards 34 are connected to the primary support bar 32 across the width of the header 10. A sickle assembly 35, comprised of a plurality of triangularly shaped knives 36 attached to an elongated knife back 37, is supported by the knife guards 34 for reciprocatory motion induced by the drive mechanism 18. The sickle assembly 35 cooperating with the knife guards 34 creates a shearing action for severing standing crop material.

Figure 7:
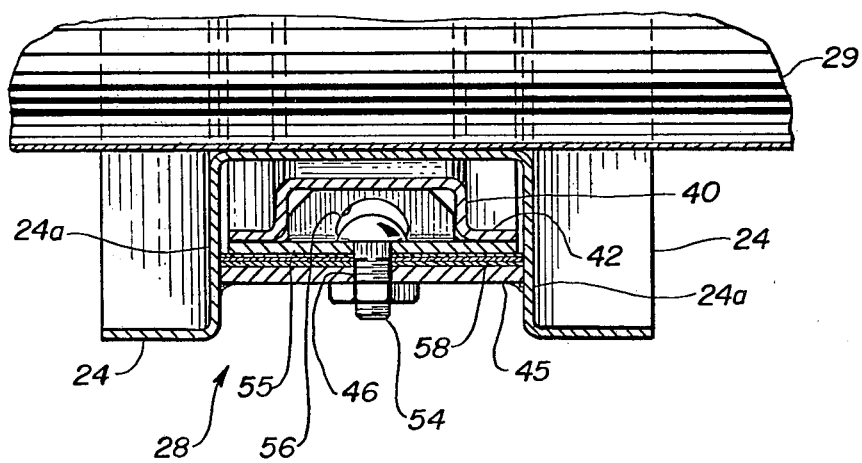
FIG. 7 is a cross sectional view through the header frame seen in FIG. 6, taken along lines 7—7 and showing the manner in which the attachment ribs of a rigid header are connected to the header frame.

The cutterbar 30 is connected to the header frame 20 by a series of attachment ribs 40 spaced along the width of the header 10. Each attachment rib 40 is fixedly connected to the primary support bar 32 of the cutterbar 30 by bolts 59 and either rigidly or pivotally connected to the hat-shaped channel members 24 at the rearward connection area 28, depending upon whether a flexible or rigid header is to be constructed. The attachment ribs 40 are also hat-shaped in cross section, but are smaller in size than the hat-shaped channel members 24, so that an attachment rib 40 can nest within the hat-shaped channel member 24, as can be best seen in FIG. 7. The rearward connection area 28 of each channel member 24 includes a transverse hole 44 through the channel member 24 and a plate 45 welded between the sides of the channel member 24 against the lower transverse beam 22. As can be seen in FIGS. 4, 6 and 7, the plate 45 has a generally vertical hole 46 therethrough.

If a flexible header 10, on in which the cutterbar 30 is free to flex vertically relative to the header frame 20, is to be constructed, the attachment rib 40 is connected to the rearward connection area 28 of the hat-shaped channel member 24 via a pivot pin 50 inserted through the transverse holes 44 in the channel 24. Although the construction of the flexible header 10 will be defined in greater detail below, the pivotal mounting of the attachment rib 40 to the channel member 24 permits the cutterbar 30 to move vertically relative to the header frame 20. Since each attachment rib 40 is permitted to pivotally move independently of all other attachment ribs 40, the cutterbar 30 is free to flex in a generally vertical direction to follow varying undulations in the ground surface. Leaf spring members 60, which provide a counterbalancing force to the weight of the cutterbar 30 as will be described in detail below, can be attached to the front connection member 26 by means of bolts 62 through the spaced apart holes 27 therein.

If a rigid header 10, one in which the cutterbar 30 is rigidly connected to the frame 20, is to be constructed, the attachment ribs 40 are connected to the front connection member 26 via bolts 52, extending through the holes 27 therein, and to the plate 45 via a bolt 54, extending through the hole 46 therein. As is best seen in FIGS. 6 and 7, the rearward end 42 of each attachment rib 40 is provided with an L-shaped bracket 55 for use in connecting the rib 40 to the plate 45. The bracket 55 includes a T-shaped slot 56 therein through which the bolt 54 can pass to reach the hole 46 in the plate 45. Since the L-shaped bracket 55 is welded to the rearward end 42 of each rib 40, the rigid connection of the attachment rib 40 to both the plate 45 and the front connection member 26 rigidly connects the cutterbar 30 to the header frame 20 to prevent any substantial relative movement therebetween. The utilization of shims 58 between the L-shaped bracket 55 and the plate 45 enables the attachment rib 40 to be pivoted a limited amount about the connection of the rib 40 with the front connection member 26. As a result, a manipulation of the number of shims 58 to be inserted between the L-shaped bracket 55 and the plate 45 provides for a vertical positional adjustment of the primary support bar 32 of the cutterbar 30, so that the guards 34 can be properly aligned along the width of the header 10 proper operation of the sickle assembly 35 therewithin. The forward floor member 57 in the rigid header 10, coupled with the rearward floor member 29, provides a continuous surface over which crop can be conveyed to the feeder house 12.

It should be realized by one skilled in the art that FIGS. 2 and 3 depict alternative shapes and designs of attachment ribs 40. It should also be realized by one skilled in the art that the primary support bar 32 in the cutterbar 30 can have different shapes, as can be seen in a comparison of FIGS. 4 and 6. The support bar 32 in FIG. 4 is an elongated, relatively flat bar which would permit a limited amount of vertical flexing, whereas the support bar 32 in FIG. 6 is comprised of a right angle member which would lend rigidity to the cutterbar 30. Furthermore, it should be readily realized that the use of the same basic header frame 20 for the construction of both a flexible and a rigid header minimizes the amount of tooling necessary when both flexible and rigid headers are to be constructed, as well as maximizes the efficient use of manpower, equipment and supplies.

FLEXIBLE HEADER

Referring now to FIGS. 1, 2, 4 and 5, the flexible crop harvesting header can be seen. As noted above, the cutterbar 30 is connected to the basic header frame 20 by an attachment rib 40 pivotally connected by pivot 50 through the rearward connection area 28 of each hat-shaped channel member 24. Bolts 59 connect each attachment rib 40 to the primary support bar 32 of the cutterbar 30. The utilization of an elongated relatively flat support bar 32 permits the cutterbar 30 to be capable of flexing along the entire width of the header 10.

Because the flexible header 10 generally rides on the ground during operation thereof, it is desirable to minimize the weight of the header actually resting on the ground and thereby minimize the possibility of damage to the cutterbar 30, as well as maximize the floating characteristics of the cutterbar 30 to enable it to closely follow the variations in the ground surface. To accomplish this, a series of spaced apart leaf spring members 60 are positioned to provide a counterbalancing force to the weight of the cutterbar 30.

Each leaf spring member 60 is connected to the front connection member 26 of the basic header frame 20 by bolts 62 and projects forwardly thereof in an arched path before terminating at its forward end 63 underneath the primary support bar 32 of the cutterbar 30. As such, the leaf spring member 60 provides an uplifting spring force to the cutterbar 30 to reduce the weight thereof on the ground surface.

To span the gap between the cutterbar 30 and the curved floor 29 over the header frame 20, a forward floor member 65 is connected to the header frame 20 by bolts 62, which connect the forward floor member 65 to both the front connection member 26 and the forwardmost end 25 of the channel members 24, and projects forwardly therefrom to the cutterbar 30. Because the cutterbar 30 is free to flex vertically about the pivotal axis 50, the forward floor member 65 is slidingly received between the primary support bar 32 and an elongated cutterbar wear strip 67. As seen in FIG. 2 the forward floor member 65 can be provided with a series of slots 69 to prevent interference with the bolts 59 connecting the attachment ribs 40 to the primary support bar 32. A more detailed description of the cutterbar wear strip 67 can be found in co-pending U.S. Ser. No. 203,173, now U.S. Pat. No. 4,324,092.

Figure 5:
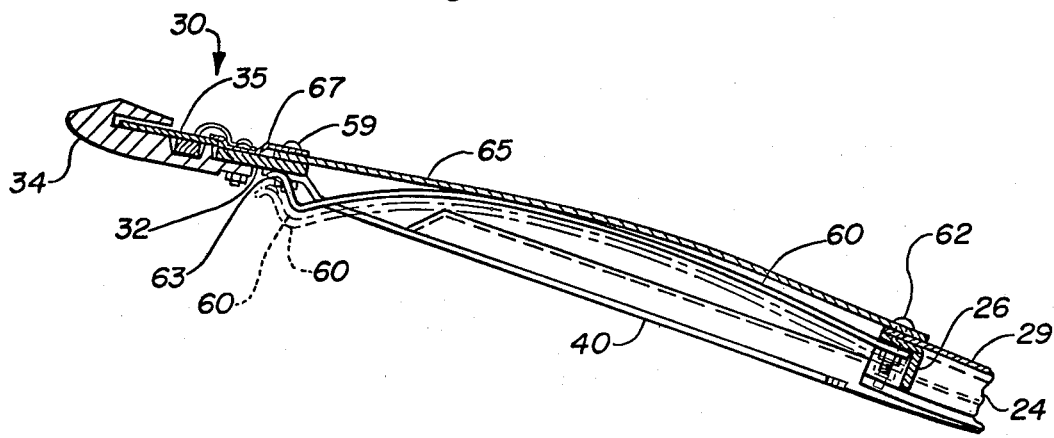
FIG. 5 is a partial cross sectional view of the flexible header seen in FIG. 2, taken along lines 5—5 and showing a leaf spring member, additional leaf spring members that can be optionally added at the same location being shown in phantom.

As can best be seen in FIGS. 4 and 5, the curved configuration of the leaf spring member 60 provides support for the forward floor members 65 intermediate the cutterbar 30 and the header frame 20. Accordingly, the forward floor member 65 can be constructed of an inexpensive, relatively thin strip of sheet metal. The combination of the cutterbar wear strip 67, forward floor member 65 and rearward curved floor member 29 provides a continuous surface over which severed crop material can be guided by both the reel 15 or the auger 16 without significant amount of crop loss.

As can be seen in FIGS. 2 and 5, increasing or decreasing amounts of counterbalancing force supplied to the cutterbar 30 can be accomplished by adding or subtracting leaf spring members 60. Since the leaf spring members 60 are connected to the header frame 20 beneath the front connection member 26, a number of leaf spring members 60 can be stacked vertically at each mounting location on the front connection member 26, as is seen in phantom in FIG. 5. Alternatively, the holes 27 in the front connection member 26 provide for a number of mounting locations for the leaf spring members 60 across the width of the header 10; therefore, a manipulation of the number of leaf spring members 60 spaced horizontally across the width of the header 10 can result in a selective varying of the weight of the header resting upon the ground. Obviously, a greater number of springs utilized would result in a lighter cutterbar with respect to the weight resting upon the ground. By using either method, of a combination of both of the methods, noted above, the amount of counterbalancing force supplied to the cutterbar 30 can be selectively varied.

It will be understood that changes in the details, material, steps and arrangement of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description may be employed in other embodiments without departing from the scope of the invention. Accordingly, the following claims are intended to protect the invention broadly as well as in the specific form shown.

Having thus described the invention, what is claimed is:

1. A flexible crop harvesting header, attachable to a crop harvesting machine to sever standing crop material and convey the severed crop material to the crop harvesting machine for further harvesting treatment, comprising:
   a frame including a rearward connection means and a transverse front connection member;
   a pair of spaced apart sidewalls supported by said frame and defining a width of said header;
   a transverse cutterbar extending between said sidewalls forwardly of said frame for severing standing crop material, said cutterbar including an elongated primary support bar and a strip-like member positioned above said support bar;

a floor supported by said frame and forming a continuous surface over which severed crop can be conveyed toward said crop harvesting machine for further harvesting treatment, said floor terminating at a forward edge positioned between said strip-like member and said primary support bar;

a plurality of transversely spaced attachment ribs pivotally connected to said frame at said rearward connection area and connected to said primary support bar of said cutterbar to support said cutterbar from said frame for vertical movement relative to said frame and to provide a support for said floor to permit a flexible movement thereof with said cutterbar; and a plurality of transversely spaced leaf spring members connected to the lower side of said front connection member and projecting forwardly therefrom to terminate beneath the primary support bar of said cutterbar, said leaf spring members providing an uplifting, counterbalancing force to the weight of said cutterbar without restrictive connection therebetween to facilitate the vertical movement of said cutterbar in following the contour of the ground and the flexible movement of said floor with said cutterbar while providing the capability of optionally stacking additional leaf spring members for selectively varying the amount of uplifting, counterbalancing force applied to said cutterbar.

2. The header of claim 1 wherein said leaf spring members are connected to said front connection member in such a manner that additional leaf spring members can be optionally stacked at each mounting location on said front connection member to selectively vary the amount of uplifting, counterbalancing force applied to said cutterbar.

3. The header of claim 1 wherein said front connection member has a plurality of transversely spaced holes therein to provide a series of mounting locations for said leaf spring members across the width of said header, said leaf spring members being detachable connected to said front connection member so that the number of leaf spring members connected to said front connection member can be selectively varied to vary the uplifting, counterbalancing force applied to said cutterbar.

4. The header of claim 3 wherein said floor includes a rearward floor member affixed to said frame and terminating at a forward portion connected to said front connection member and a forward floor member having a rearward edge connected to said front connection member, said forward floor member projecting forwardly from said rearward edge to terminate at said forward edge positioned between said strip-like member and said primary support bar.

5. The header of claim 4 wherein said strip-like member is connected to said primary support bar by a series of transversely spaced bolts, said strip-like member having a rearward portion spaced above said primary support bar, said forward edge of said forward floor member being slidably received between said strip-like member and said primary support bar, such that vertical movement of said cutterbar relative to said frame is not restricted by said forward floor member.

6. The header of claim 5 wherein said strip-like member, said forward floor member and said rearward floor member provide a continuous guide surface over which severed crop material can be conveyed to said crop harvesting machine without the loss of crop material therethrough.

7. The header of claim 4 wherein said leaf spring members have a curved longitudinal cross-sectional configuration, each said leaf spring member providing support for said forward floor member intermediate said cutterbar and said front connection member.

8. The header of claim 7 wherein said rearward connection means provides a pivotal connection of each said attachment rib with said frame rearward of said front connection member, the movement of each said attachment rib about the respective pivotal connection causing said cutterbar to flex vertically to follow variations in the ground surface, said forward floor member flexing with said cutterbar to provide a generally smooth and continuous guide surface over which severed crop material can be conveyed.

9. The header of claim 8 wherein each said attachment rib is rigidly connected to said primary support bar and said pivotal connections are horizontally disposed along a common axis so that side-to-side movements of said cutterbar are minimized.

10. The header of claim 9 further including a reel mounted above said header floor to convey severed crop rearwardly and an auger transversely mounted between said sidewalls rearwardly of said reel to consolidate severed crop material and feed the consolidated crop material rearwardly from said header toward said crop harvesting machine, said rearward floor member being curved to provide a trough within which said auger is operable to consolidate crop material.

11. The header of claim 2 or 10 wherein said attachment ribs can be connected to said front connection member to lock said cutterbar into a fixed position relative to said frame.

* * * * *